Oct. 27, 1942.        C. L. WAGNER        2,300,364
SAFETY GLASSES
Filed Dec. 23, 1940
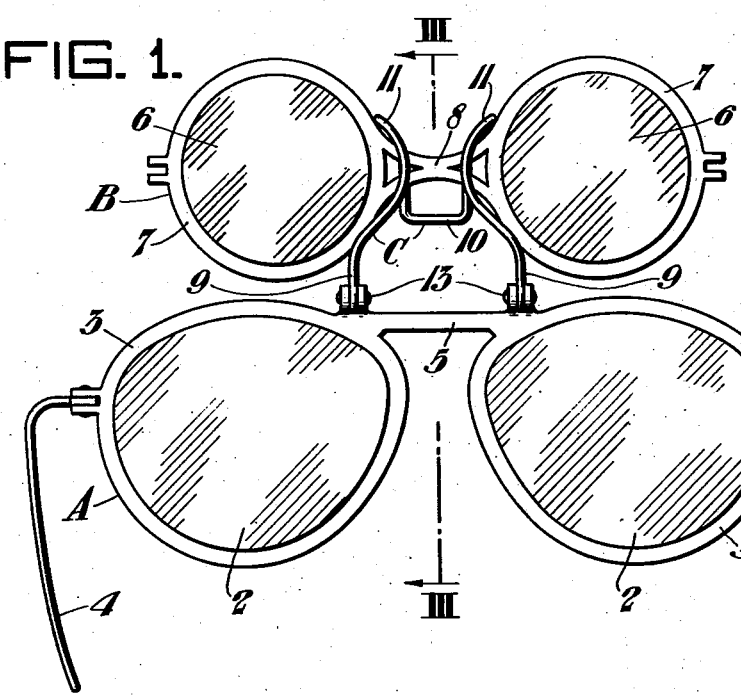
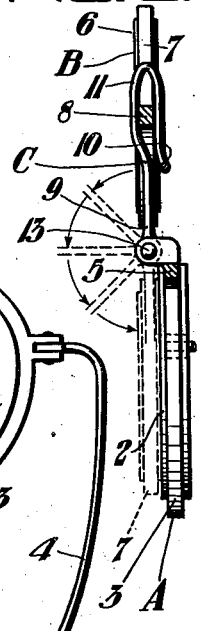
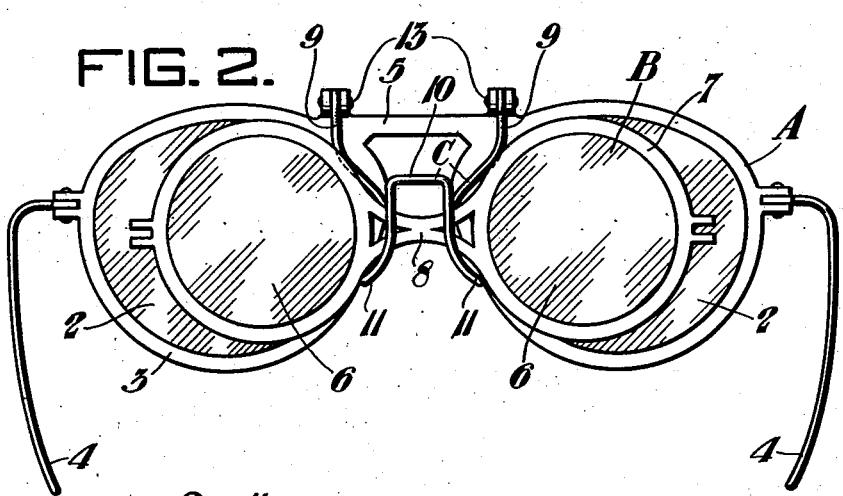
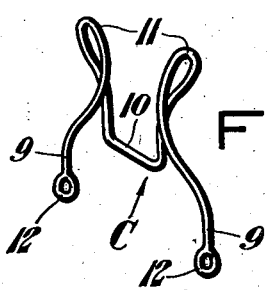
Inventor:
CHARLES L. WAGNER,
by John E. Jackson
his Attorney.

Patented Oct. 27, 1942

2,300,364

UNITED STATES PATENT OFFICE 2,300,364

SAFETY GLASSES

Charles L. Wagner, Pittsburgh, Pa.

Application December 23, 1940, Serial No. 371,436

2 Claims. (Cl. 88—41)

This invention relates to improvements in safety glasses, and more particularly to combination glasses for protection against flying particles or injurious light rays or both.

Safety glasses or goggles of shatter-proof glass are in common use, as are colored glasses for protection against light rays, but certain conditions prevent their prolonged use together. For example, men working around molten metal, hot furnaces and the like may require continued protection for the eyes against heat, flying particles, etc., but infrequently need protection against light rays. Further, such workmen must have clear vision the greater proportion of the time, and cannot therefore be hampered by colored glasses such as are commonly employed for protection against light rays.

In present practice, such workmen attempt protection against injurious light rays by holding colored glasses before their eyes when intentionally viewing molten metal, etc., the degree of protection thereby being dependent upon the workman's diligence in procuring and holding the glasses. However, where the workman must use his hands under such practices, eye protection is forgotten or impossible. Also, the workman may unintentionally become subjected to injurious light rays with resulting hazard to the eyes.

A still further consideration resides in the matter of the personal preference of the workmen for different colored glasses, making it impracticable to provide a single standardized colored glass for such purposes.

It is an object of my invention to provide combination safety glasses adapted for universal use, and capable of selective variation for protection against flying particles or light rays or both.

My invention contemplates safety glasses or goggles capable of being selectively combined with various colored glasses according to personal preference therefor, and provides for materially increased safety through convenience and availability of the glasses to the user.

Additional objects and advantages will become apparent from the following description taken in connection with the accompanying drawing, wherein:

Figure 1 is an elevational view of a pair of combination safety glasses embodying my invention, with said glasses in position for protection against flying particles, etc.;

Figure 2 is a similar view, showing the glasses in position for protection against flying particles and injurious light rays;

Figure 3 is a sectional view taken on the line III—III of Figure 1, showing the various positions of adjustment of the glasses; and Figure 4 is a perspective view of the mounting clip of the invention.

Referring to the drawing, A designates a pair of safety glasses or goggles containing lenses 2 of shatter-proof glass and including a frame 3 and bows or earpieces 4. Said frame includes a central nosepiece or bridge 5 between the lenses.

My invention provides means in conjunction with said glasses or goggles A for selectively mounting thereon a second pair of glasses B containing lenses 6 of light-protective glass, as for example, cobalt glass, having the property of excluding ultra-violet and infra red rays which are injurious to the eyes. To this end I prefer to provide for and utilize standard glasses B of the spectacle type, having a frame 7 and nose or bridgepiece 8, said glasses preferably having their bows or earpieces removed.

For the purpose of combining the glasses A and B in the desired manner, I provide a mounting clip C which may be formed of spring wire or the like bent into substantially U-shape, providing spaced-apart hinge arms 9 and a terminal gripping portion 10. Said gripping portion 10 is formed by reversely bending the central portion of the U-shaped wire upon itself, forming spaced resilient looped portions 11.

The terminals of the arms 9 are apertured at 12 for hinged connection with the glasses A, as by bearings 13 at the top of the frame 3 spaced on either side of the nose or bridge-piece 5. The bearings 13 and arms 9 are pivotally secured by suitable rivets or pins exerting a sufficient clamping force upon said members to frictionally secure the same against free motion.

With the clip C thus frictionally hinged to the frame of the glasses A, the gripping portion 10 thereof is centrally transversely alined with the nose portion 5 of said glasses, and glasses B may be inserted in said clip by engaging the nosepiece 8 thereof in the resilient loops 11 of said gripping portion. When so supported, the glasses B will be in substantial parallelism with the glasses A, and may be rotated toward and away from the glasses A in a direction transversely of the latter, as shown in Figure 3.

In this manner, the wearer may elevate the glasses B over the forehead, as in Figure 1, when not desired, and still have the protection afforded by the glasses A, and when protection against light rays is desired, the glasses B may be lowered over the glasses A, as in Figure 2, the combination providing availability for either form of protection as and when desired.

It will be noted also that the user may place the glasses B in an intermediate position to ward off injurious light rays from above, while maintaining clear protected vision on the floor through glasses A, as indicated by the dotted line positions of Figure 3.

By means of my invention, the workman may use those colored glasses B for which he has personal preference. From the standpoint of safety, the invention provides maximum protection to the eyes of the workman by making the two types of glasses available and usable under the varying conditions in practice.

Various changes and modifications are contemplated within the scope of the following claims.

I claim:

1. Safety glasses having means for supporting the same on the head of the user and including a clip for removably mounting a second pair of glasses, said clip being frictionally hinged to the first glasses at the top of the nose portion thereof for rotation transversely of the first glasses and having a terminal resilient gripping portion for receiving and securing the nosepiece of the second glasses.

2. Safety glasses having means for supporting the same on the head of the user and including a clip for removably mounting a second pair of glasses, said clip having spaced arms frictionally hinged on either side of the nose portion of the first glasses adjacent the top thereof, and said clip having a central gripping terminal for frictionally engaging the nosepiece of the second glasses to removably support the latter.

CHARLES L. WAGNER.